(12) United States Patent
De Vries et al.

(10) Patent No.: US 6,666,308 B1
(45) Date of Patent: Dec. 23, 2003

(54) MODULAR ACTUATOR, AND BRAKE CALLIPER COMPRISING SUCH ACTUATOR

(75) Inventors: Alexander Jan Carel De Vries, Ka Tiel (NL); Armin Herbert Emil August Olschewski, Nieuwegein (NL); Hendrikus Jan Kapaan, Nieuwegein (NL); Clair Druet, Drumettaz Clarafond (FR); Thomas Wilheim Fucks, Aken (DE); Johannes Albertus Van Winden, CM Oudewater (NL); Andries Christiaan Rinsma, Drachten (NL); Jacobus Zwarts, Nieuwegein (NL)

(73) Assignee: SKF Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/529,220

(22) PCT Filed: Oct. 15, 1998

(86) PCT No.: PCT/NL98/00590

§ 371 (c)(1),
(2), (4) Date: Apr. 20, 2000

(87) PCT Pub. No.: WO99/21266

PCT Pub. Date: Apr. 29, 1999

(30) Foreign Application Priority Data

Oct. 16, 1997 (NL) .............................................. 1007296

(51) Int. Cl.⁷ ............................................... F16D 65/21

(52) U.S. Cl. ........................ 188/157; 188/156; 188/72.1
(58) Field of Search ................................. 188/156, 157, 188/161, 162, 158, 159, 72.1

(56) References Cited

U.S. PATENT DOCUMENTS

| | | | |
|---|---|---|---|
| 2,444,886 A | 7/1948 | Vickers | |
| 2,988,609 A | 6/1961 | Butler | |
| 4,579,012 A | 4/1986 | Mabie et al. | |
| 4,685,345 A | 8/1987 | Gruss | |
| 4,867,000 A | 9/1989 | Lentz | |
| 5,067,826 A | 11/1991 | Lemelson | |
| 5,107,967 A | 4/1992 | Fujita et al. | |

FOREIGN PATENT DOCUMENTS

| | | |
|---|---|---|
| DE | U1 87 09 233 | 9/1987 |
| GB | A 810977 | 3/1959 |
| WO | WO A1 96/03301 | 2/1996 |
| WO | WO A1 97/11287 | 3/1997 |

*Primary Examiner*—Matthew C. Graham
(74) *Attorney, Agent, or Firm*—Oliff & Berridge, PLC

(57) ABSTRACT

An actuator comprises a housing, a motor (5), an actuating member (11, 12) and a screw mechanism (2) providing a linear movement of the actuating member (11, 12) with respect to the housing in response to a rotational movement of the motor (5), which screw mechanism (2) comprises a screw (17, 47) and a nut (13, 46) one of which is rotatably supported with respect to the housing by means of an angular contact bearing, and a reduction gear means (4). The actuating member (11, 12) and the reduction gear means (4) are situated at opposite ends of the screw mechanism (2).

38 Claims, 5 Drawing Sheets

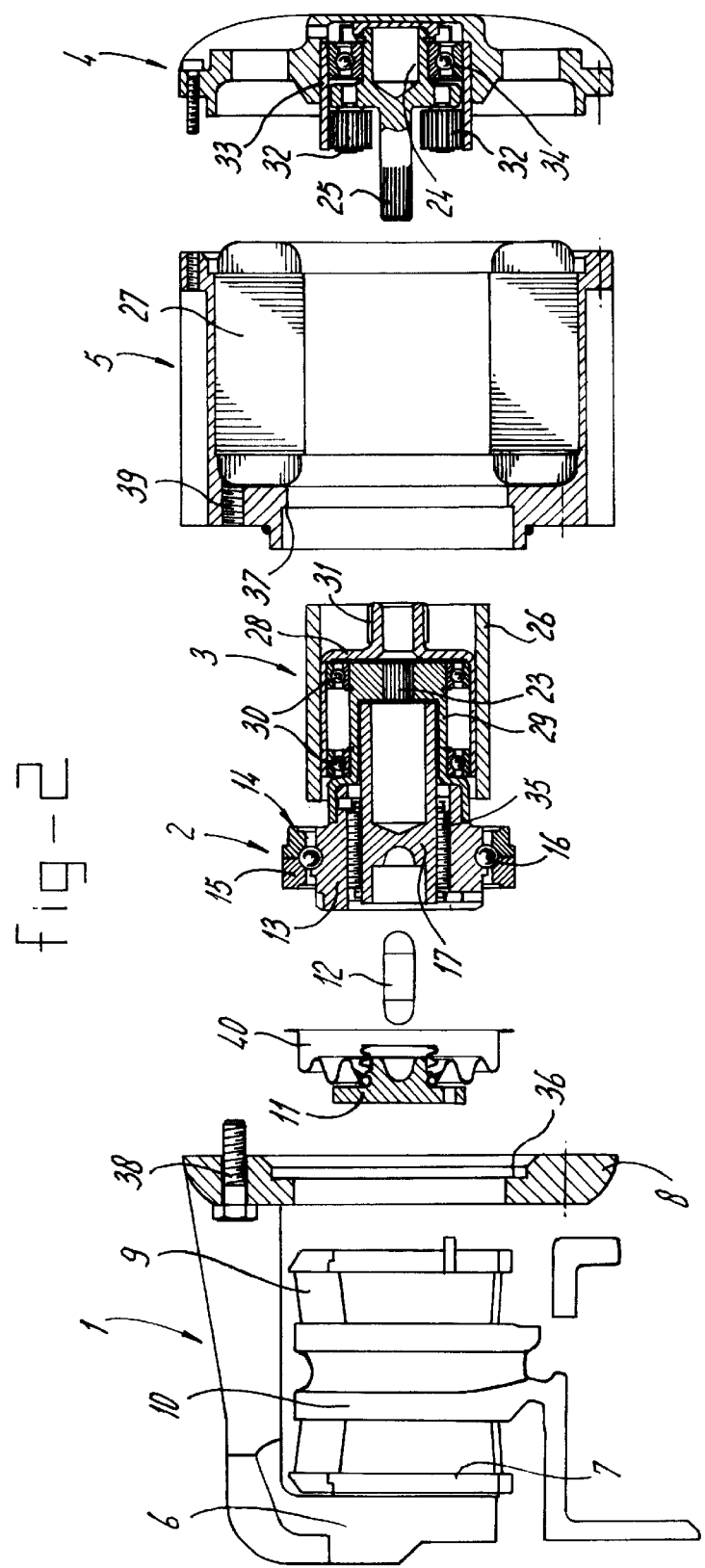

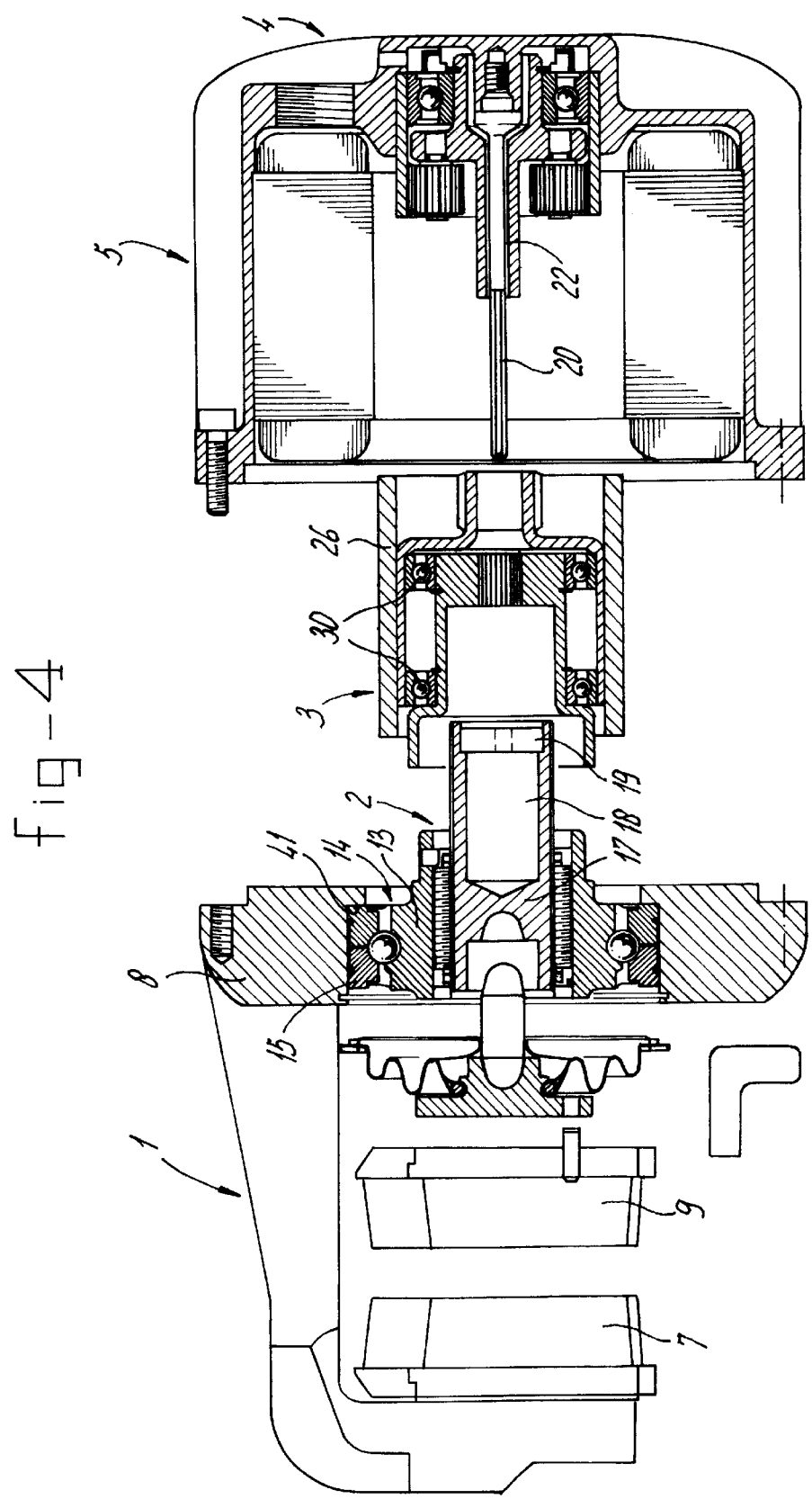

MODULAR ACTUATOR, AND BRAKE CALLIPER COMPRISING SUCH ACTUATOR

The invention is related to an actuator, comprising a housing, a motor, an actuating member and a screw mechanism providing a linear movement of the actuating member with respect to the housing in response to a rotational movement of the motor, which screw mechanism comprises a screw and a nut one of which is rotatably supported with respect to the housing by means of an angular bearing, and a reduction gear means.

Such actuator is known from WO-A-9603301. Said known actuator, which is a part of an electrically actuatable brake calliper for a disc brake, comprises a roller screw mechanism and a satellite gear wheel mechanism. The screw mechanism is accommodated partly within an electric motor. The end of said screw mechanism which protrudes from the electric motor towards the brake pads, carries an integrated thrust bearing as well as an integrated satellite gear wheel mechanism.

The satellite gear wheel system is positioned around the screw mechanism. This position leads to rather big radial dimensions of the satellite gear wheel system, whereby the stiffness of said system is reduced and the operational deflections are increased. Thus, the required transmission stiffness cannot be maintained. Moreover, as a result of this layout, this known actuator is rather complicated and therefore rather cumbersome with respect to manufacturing.

A further drawback of the complicated integrated structure of the prior art actuator is related to the area of manufacturing. Usually, manufacturing of rolling mechanisms such as the rolling bearing and the screw mechanism require a different background than manufacturing gear systems. As these components are integrated to a considerable degree in the prior art actuator, problems may arise as to the proper selection of combined required different manufacturing technologies and the proper control of these manufacturing processes.

The object of the invention is therefore to provide an actuator which does not have these disadvantages. This object is achieved in that the actuating member and the reduction gear means are situated at opposite ends of the screw mechanism.

In the actuator according to the invention, the reduction gear means is at a different position than the screw mechanism, which has several advantages. For instance, such position is less subject to space constraints. Furthermore, the reduction gear means is at a distance from the actuating member, which allows more space and freedom of design for those components.

According to a further important advantage of the invention, the actuator can now be carried out in such a way that the reduction gear means is contained in a reduction gear module and the screw mechanism is contained in a screw mechanism module, said reduction gear module and screw mechanism module being interconnected through a drive module.

The modular layout of the several components which make up the drive line of the actuator, enables the application of dedicated required manufacturing technologies and processes for each individual component of the entire system. Also, the modular design opens ways for parallel production of components, leading to a more streamlined and cost effective production process.

Nevertheless, after manufacturing the said components in this way, they may be united in pre-assembled sub-units. For instance, the reduction gear module and the screw mechanism module are integrated, or the screw mechanism module and the drive module are integrated.

The layout of the several modules may be designed such that at least two modules are axially aligned, or that at least two modules are axially shifted or excentric with respect to each other.

According to a preferred embodiment, the drive module is situated between the reduction gear module and the screw mechanism module.

A drive system with an electric drive module may have a first drive shaft engaging the electric motor and the reduction gear module, and a second drive shaft interconnecting the reduction gear module and the screw mechanism module, wherein the first and the second drive shaft are coaxial and are mutually supported by means of at least one rolling element bearing.

Advantageously, the first and second drive shaft are accommodated within each other, the rotor of the electric motor engaging the outer drive shaft.

In order to better accommodate the loadings on the actuating member, the screw mechanism module may comprise an angular contact bearing.

Said bearing may be supported within the housing in different ways. According to a first possibility, the outer ring of the angular contact bearing rests against the radial surface of the inwardly protruding flange facing away from the brake pads, said outer ring and flange being held against each other by means of bolts under tension.

According to a second possibility, the outer ring of the angular contact bearing rests against a radial surface of the inwardly protruding flange which faces towards the brake pads. In this embodiment, the outer ring is pressed firmly onto said flange under the influence of the actuating forces, which means that such construction can do without highly loaded bolts.

The reduction gear module may comprise at least part of a planetary gear system having a stationary outer ring gear with inwardly pointing gear teeth. In particular, the reduction gear module may comprise satellite gear wheels which mesh with the ring gear and which are accommodated on a carrier connected to a rotary shaft engaging the screw mechanism, and the sunwheel of the planetary gear system may be accommodated on a drive shaft of the drive module.

Alternatively, the nut may engage the stationary ring of the angular contact bearing by means of a holding member, such that the nut is slidable in axial direction but non-rotatable, and the screw is supported rotatably but non-slidable by means of the rollers and a bearing.

Furthermore, a sensor may be provided for detecting rotational and/or translational movements of the screw mechanism. Also, control means may be provided, said control means having an input for a control signal, e.g. from a brake pedal, and being connected to the sensor fear controlling the electric motor on the basis of the control signal and the signal from the sensor. The sensor is in particular suitable for obtaining force feedback, wear compensation and/or maintenance indication.

The actuator according to the invention can be applied for different purposes. In particular, the actuator is suitable for use in a brake calliper for an electrically actuatable disc brake, said calliper comprising an actuator as described before, and a claw piece carrying two opposite brake pads, said actuator comprising a screw and a nut one of which is rotatably supported with respect to the housing by means of an angular bearing, and a reduction gear means.

The invention will now be described further with reference to several embodiments of brake callipers, containing an actuator according to the invention.

FIG. 2 shows the brake calliper according to FIG. 1, in exploded view.

FIG. 4 shows the brake calliper according to FIG. 3, in exploded view.

Figure 1:
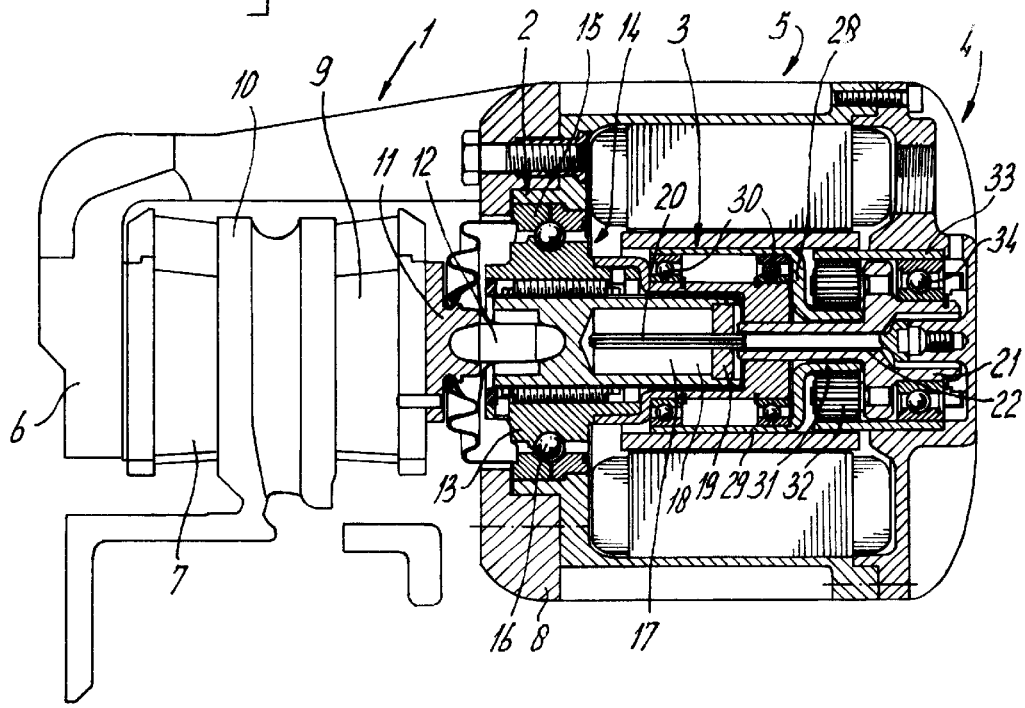
FIG. 1 shows a first embodiment for a brake calliper with actuator.

The brake calliper as shown in FIGS. 1 and 2 comprises a claw piece 1, a screw mechanism module 2, a drive module 3, a reduction gear module 4, and an electric motor 5. The claw piece 1 comprises an outer flange 6, onto which a brake pad 7 has been mounted, and an inner flange 8. Furthermore, there is another brake pad 9, as well as a brake disc 10 situated between the brake pads 7 and 9.

The modules 2, 3 and 4 or sub-assemblies thereof, can be pre-assembled into a sealed and lubricated actuating unit, which can be fitted in the brake calliper by means of bolts.

Brake pad 9 engages an actuating head 11, which by means of actuating rod 12 engages the screw mechanism module 2. This screw mechanism module 2 comprises a rotatable nut 13, which is integrated with an inner bearing ring of bearing 14. This bearing 14 furthermore contains a split outer ring 15, as well as a series of rolling balls 16. The actuating rod 12 is held in the screw 17 by a seal lid of the rubber bellows.

The screw mechanism furthermore comprises a screw 17, which is slidable in axial direction but which is fixed against rotation. In FIG. 1, screw 17 is provided with a hollow space 18 comprising a fixed disc 19 with an unround opening, through which extends a fixed pin 20 at the same cross-sectional unround shape. Disc 19, and thereby screw 17, is slidable with respect to the rod 20 in axial direction, but not rotatable. Pin 20 is connected in the bore 22 of a fixed central shaft 21 contained in the reduction gear module 4.

In the variant of FIG. 2, screw 17 comprises a bore 23 having a circumference 23 with keys and grooves, co-operating with the keys and grooves 25 on a shaft 24 fixed in reduction gear module 4.

The drive module 3 contains the rotor 26 of the electric motor, the stator 27 of which is contained in motor 5. Furthermore, drive module 3 has a first or outer drive shaft 28 connected to the rotor 26, and a second or inner drive shaft 29 which are mutually rotatably supported by means of ball bearings 30. The first drive shaft 28 contains a sun gear wheel 31, which engages satellite gear wheels 32 of the reduction gear module 4. In turn, the satellite gear wheels engage a stator ring 33 having inwardly facing teeth gears. The satellite gear wheels 32 are each rotatably mounted onto the shaft 24, which in turn by means of bearing 34 is supported rotatably within the reduction gear module 4.

Upon rotating rotor 26 of motor 5, sun wheel 31, and thereby satellite gear wheels 32 are rotated. As a result, drive shaft 24 is rotated with a reduced rotational speed, as a result of which the second or inner drive shaft 29 and thereby the nut 13 is rotated. This rotation of nut 13 produces an axial displacement of screw 17, whereby the brake pads 7 and 9 are pressed onto the brake disc 10.

The screw 17 and the nut 13 of the screw mechanism co-operate with each other by means of rollers 35, which are known per se.

The outer ring 15 of bearing 14 rests against a radial face 36 of flange 8, which radial face 36 faces away from the brake pads 7, 9. Furthermore, the outer ring 15 of the bearing 14 rests against an opposed face 37 of drive system 5. By means of bolts 38, which engage screw threaded holes 39 in drive system 5, the faces 36 and 37 are drawn towards each other, whereby the split outer ring 15 of bearing 14 is held firmly clamped. Thus, the four-point contact angle loading pattern of bearing 14 is obtained.

By means of bellows 40, the internal space of screw mechanism 2, drive module 3, drive system 5, and reduction gear module 4 is protected against dirt etc.

Figure 3:
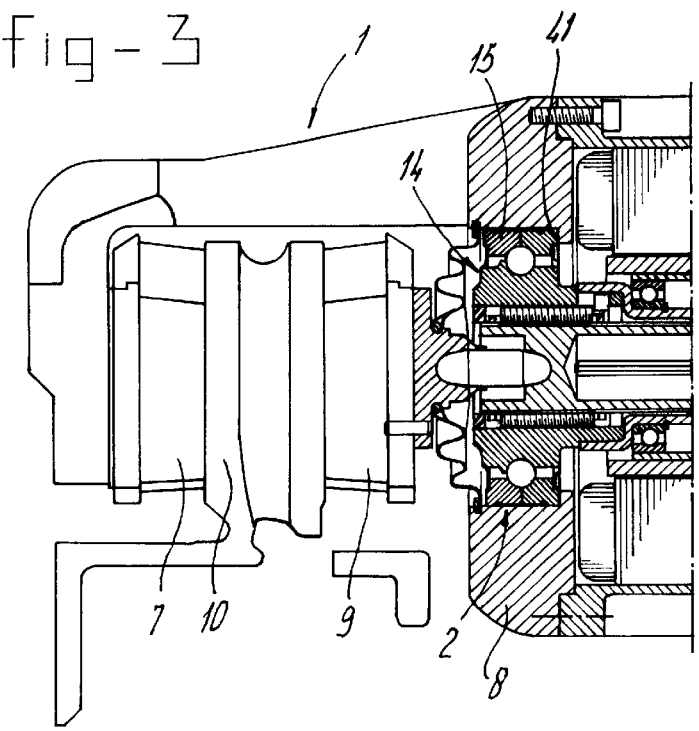
FIG. 3 shows a second embodiment of a brake calliper.

The embodiment of FIGS. 3 and 4 resembles to a large extent the embodiment of FIGS. 1 and 2. However, in this case the outer ring 15 of the bearing 14 rests against the supporting face 41 which faces towards the brake pads 7, 9. Upon actuating of the screw mechanism 2, the outer ring 15 of the bearing 13 is firmly compressed against supporting face 41. Thus, in this embodiment no bolts acting under tension are needing for resisting the brake forces exerted by brake pads 7, 9 on brake disc 10.

FIG. 4 also clearly shows the modular layout of the brake calliper.

Figure 5:
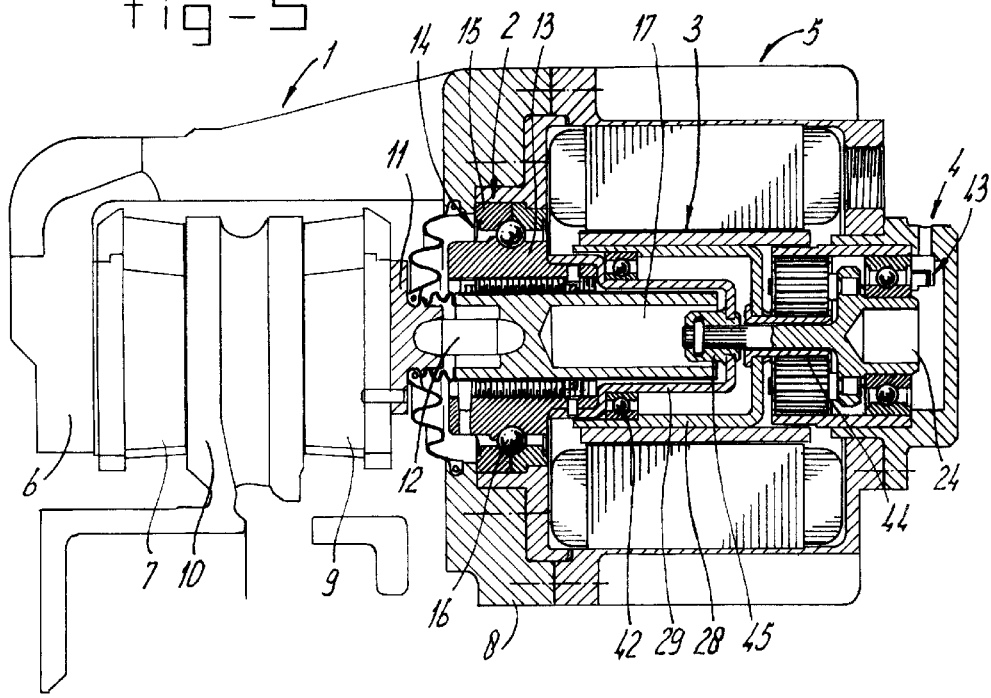
FIG. 5 shows a third embodiment of a brake calliper.

The embodiment of FIG. 5 also to a large extent corresponds to the embodiment of FIGS. 1–3. The first or outer shaft 28 and the second or inner shaft 29 are mutually supported in a rotatable way by means of only one bearing 42. Moreover, a sensor 43 has been provided for measuring the angular speed of shaft 42.

As a further difference, the sun wheel 44 is constituted by a separate element, clamped onto first drive shaft 28. The second drive shaft 29 also carries a separate element 45, which contains a hollow space with keys and grooves, co-operating with corresponding keys and grooves on shaft 24.

Figure 6:
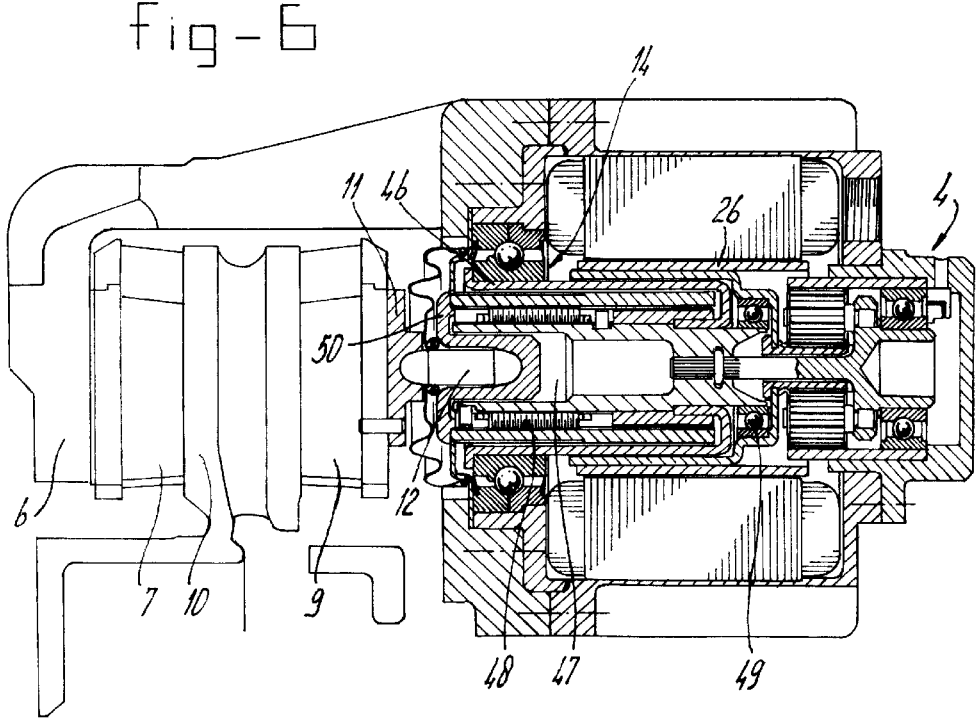
FIG. 6 shows a fourth embodiment of a brake calliper.

In the embodiment of FIG. 6, which to some extent corresponds to the embodiments of FIGS. 1–4, a nut 46 has been applied which is slidable in axial direction, but which is non-rotatable. The screw 47 is rotatable, but not movable in axial direction. By means of rollers 48, the nut 46 and screw 47 co-operate with each other.

The rotatable support of the screw 47 is obtained by means of a bearing 49 and by means of rollers 48. At its end facing the brake pads 7, 9, the nut 46 carries an actuating piece 15, which protrudes in the hollow of the screw 47. The actuating rod 12 extends between the bottom of the actuating piece 50 and actuating plate 11.

Via the reduction gear module, the rotational movement of rotor 26 is transferred to the screw 47. The axial forces exerted on the screw 47 as a result of the clamping action of the brake pads 7, 9 on the brake disc 10 are absorbed by the bearing 14, through the sleeve 53 which connects the inner ring 13 of said bearing 14 to the screw 47.

The nut 46 is held against rotation by holding member 50, which is connected to the stationary ring 13 of the bearing 14. Said holding member 50 however allows axial displacements of the nut 46. These functions can be obtained by engaging unround shapes (not shown) of the holding member 50 and the nut 46.

Figure 7:
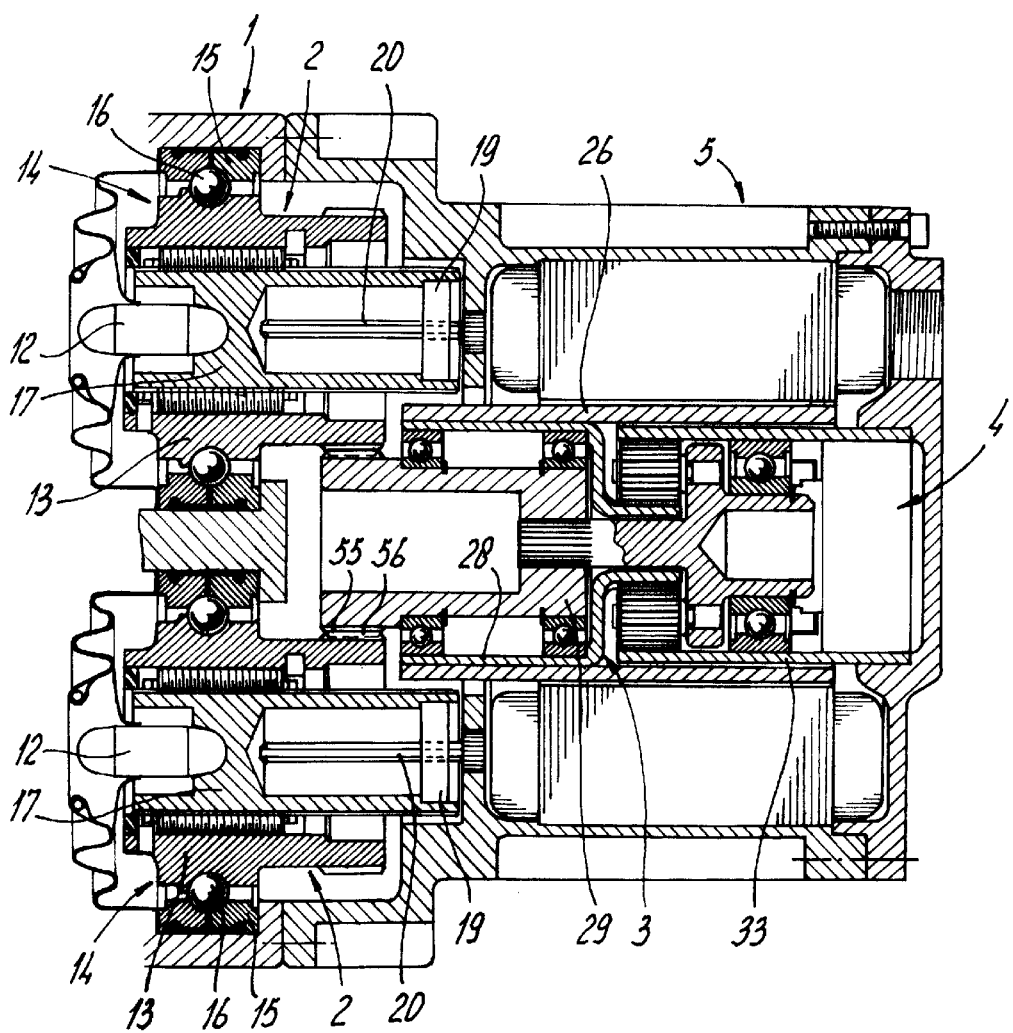
FIG. 7 shows a fifth embodiment of an actuating mechanism.

In the embodiment of FIG. 7, two screw mechanism modules 2 have been applied, which engage one common central drive module 3 which in turn via a reduction gear module 4 is connected to motor 5. The screw mechanism modules 2 can be identical to the screw mechanism modules as depicted in FIGS. 1 and 3; the drive module 3 can be identical to the drive module as shown in FIG. 2.

However, in the embodiment of FIG. 7, the drive or outer ring 29 carries external gear teeth 55. Furthermore, the inner rings 13 of the bearings 14 of both screw mechanism modules 2 have external teeth 56 as well, which engage the teeth 55 of the drive shaft 29 of drive module 3.

By rotating the outer ring 29 of the drive module 3, as described with reference to the embodiments of FIGS. 1 and 2, both outer rings 13 of the bearings 14 are rotated, whereby, in the end, the actuating rods 12 are moved in unison.

In the embodiment of FIG. 7, the axis of the drive module 3 and the screw mechanism modules 2 are laterally shifted, but are contained in the same plane. It is also possible to situate one of these axes outside the common plane of the other two axes. Moreover, it is possible to apply more than two, e.g. three screw mechanism modules which engage with one and the same drive module 3.

What is claimed is:

1. An actuator, comprising a housing, a motor, an actuating member and a screw mechanism providing a linear movement of the actuating member with respect to the housing in response to a rotational movement of the motor, which screw mechanism comprises a screw and a nut one of which is rotatably supported with respect to the housing by means of a contact ball bearing, and a reduction gear means, characterised in that the actuating member and the reduction gear means are situated at opposite ends of the screw mechanism, said reduction gear means being contained in a reduction gear module, comprising at least part of a gear system having a stationary outer ring gear with inwardly pointing gear teeth and the screw mechanism being contained in a screw mechanism module, comprising a four-point angular contact ball bearing.

2. The actuator according to claim 1, wherein the reduction gear means is contained in a reduction gear module and the screw mechanism is contained in a screw mechanism module, said reduction gear module and screw mechanism module being interconnected through a drive module.

3. The actuator according to claim 2, wherein the reduction gear module and the screw mechanism module are integrated.

4. The actuator according to claim 2, wherein the screw mechanism module and the drive module are integrated.

5. The actuator according to claim 2, wherein at least two modules are axially aligned.

6. The actuator according to claim 2, wherein at least two modules are laterally shifted or excentric with respect to each other.

7. The actuator according to claim 6, wherein the drive module engages two laterally shifted screw mechanism modules.

8. The actuator according to claim 2, wherein the drive module is situated between the reduction gear module and the screw mechanism module.

9. The actuator according to claim 2, wherein the drive module has a first drive shaft engaging the motor and the reduction gear module, and a second drive shaft interconnecting the reduction gear module and the screw mechanism module.

10. The actuator according to claim 9, wherein the first and the second drive shaft are coaxial and are mutually supported by means of at least one rolling element bearing.

11. The actuator according to claim 10, wherein the first and second drive shaft are accommodated within each other, and the rotor of an electric motor engages the outer drive shaft.

12. The actuator according to claim 11, wherein the outer ring of the angular contact bearing rests against the radial surface of the inwardly protruding flange facing away from brake pads, said outer ring and flange being held against each other by means of bolts under tension.

13. The actuator according to claim 11, wherein the outer ring of the angular contact bearing rests against a radial surface of the inwardly protruding flange which faces towards brake pads.

14. The actuator according to claim 1, wherein the nut of the screw mechanism is rotatably supported by means of the angular contact bearing, and the screw is held against rotating.

15. The actuator according to claim 14, wherein the screw is connected to the stationary ring of the angular contact bearing by means of a rubber bellows.

16. The actuator according to claim 15, wherein the rubber bellows and the screw enclose a space containing a lubricant.

17. The actuator according to claim 15, wherein the reduction gear module comprises a non rotatable rod or shaft which protrudes in a bore provided in the screw of the screw mechanism module, said screw and rod being connected mutually slidable and non-rotatable.

18. The actuator according to claim 15, wherein said rod has through-going, central channel for relubricating the screw mechanism.

19. The actuator according to claim 1, wherein the nut engages the stationary ring of the angular contact bearing by means of a holding member, such that the nut is slidable in axial direction but non-rotatable, and the screw is supported rotatably but non-slidable by means of the rollers and a bearing.

20. The actuator according to claim 19, wherein at its end facing brake pads, the nut carries a support member which is enclosed by the nut and which extends into a hollow space in the screw, said support member supporting the actuating rod.

21. The actuator according to claim 19, wherein the screw is held rotatably against axial loads by the bearing through a sleeve which encloses the nut and which is connected at one end to the inner bearing ring and at its other end to the screw.

22. The actuator according to claim 1, wherein the reduction gear module comprises satellite gear wheels which mesh with the ring gear and which are accommodated on a carrier connected to the shaft engaging the screw mechanism.

23. The actuator according to claim 22, wherein the sun wheel of the planetary gear system is accommodated on a drive shaft of the drive module.

24. The actuator according to claim 1, wherein a sensor, in a closed loop configuration with an electric motor, is provided for detecting rotational and/or translational movements of the screw mechanism.

25. The actuator according to claim 24, wherein control means are provided, said control means having an input for a control signal and being connected to the to sensor for controlling the electric motor on the basis of the control signal and the signal from the sensor.

26. The actuator according to claim 1, wherein the screw mechanism is an anti-friction screw mechanism, a ball screw or a differential screw.

27. The actuator according to claim 26, wherein the screws, rollers or balls of the screw mechanism are coated so as to maintain the proper function of the screw under dry-running conditions such as a diamond-like carbon coating.

28. The actuator according to claim 1, wherein the motor is an electric motor.

29. The actuator according to claim 1, wherein the motor is a hydraulic motor.

30. The actuator according to claim 1, wherein the motor is a pneumatic motor.

31. The actuator according to claim 1, wherein at least one of the components is obtained by means of a hard-turning manufacturing process.

32. The actuator according to claim 1, wherein the reduction gear module, screw mechanism module and drive module are pre-assembled so as to form a unity ready for mounting onto a brake calliper.

33. An actuator, comprising a housing, a motor, an actuating member and a screw mechanism providing a linear movement of the actuating member with respect to the housing in response to a rotational movement of the motor, which screw mechanism comprises a screw and a nut one of which is rotatably supported with respect to the housing by means of an angular contact bearing, and a reduction gear means, characterized in that, the reduction gear means is contained in a reduction gear module and the screw mechanism is contained in a screw mechanism module.

34. The actuator according to claim 33, wherein the reduction gear module and screw mechanism module are interconnected through a drive module.

35. A reduction gear module for use in the actuator with one or more reduction steps according to claim 1.

36. An anti-friction screw mechanism module for use in the actuator according to claim 1.

37. A drive module for use in the actuator according to claim 1.

38. A brake calliper for an electrically actuatable disc brake, said calliper comprising an actuator according to claim 2, and a claw piece carrying two opposite brake pads, said actuator comprising a screw and a nut one of which is rotatably supported with respect to the housing by means of an angular contact bearing, and a reduction gear means.

* * * * *